United States Patent
Fujisaki et al.

(10) Patent No.: US 6,337,566 B1
(45) Date of Patent: Jan. 8, 2002

(54) CONTINUOUS CASTING APPARATUS USING A MOLTEN METAL LEVEL GAUGE

(75) Inventors: Keisuke Fujisaki; Kiyoshi Wajima; Hideki Matsuda; Masahiro Tani, all of Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/367,179

(22) PCT Filed: Dec. 8, 1998

(86) PCT No.: PCT/JP98/05551
§ 371 Date: Aug. 9, 1999
§ 102(e) Date: Aug. 9, 1999

(87) PCT Pub. No.: WO99/29453
PCT Pub. Date: Jun. 17, 1999

(30) Foreign Application Priority Data

Dec. 8, 1997 (JP) .............................. 9-337197
Dec. 25, 1997 (JP) .............................. 9-357486
Dec. 26, 1997 (JP) .............................. 9-360315
Dec. 26, 1997 (JP) .............................. 9-361161

(51) Int. Cl.$^7$ .......................... G01B 7/14; B22D 11/16; G01F 23/26
(52) U.S. Cl. .............................. 324/207.17; 73/290 R; 164/450.5
(58) Field of Search .......................... 324/207.17, 204, 324/207.12, 207.26, 225, 239–243; 73/290 R; 164/151.3, 450.5

(56) References Cited

U.S. PATENT DOCUMENTS

| 4,635,832 A | * | 1/1987 | Angerer et al. | ............. 324/226 |
| 4,647,854 A | * | 3/1987 | Yamada et al. | ............. 324/225 |
| 4,708,191 A | * | 11/1987 | Block et al. | ................. 324/204 |

FOREIGN PATENT DOCUMENTS

| JP | 52-32824 | 3/1977 | ........... B22D/11/10 |
| JP | 62-46172 | 3/1987 | ........... B22D/11/16 |
| JP | 64-83348 | 3/1989 | ........... B22D/11/10 |
| JP | 3-122526 | 5/1991 | ........... G01F/23/26 |
| JP | 3-138536 | 6/1991 | ........... G01F/23/26 |
| JP | 4-187355 | 7/1992 | ........... B22D/11/18 |
| JP | 4-238661 | 8/1992 | ........... B22D/11/18 |
| JP | 6-122056 | 5/1994 | ........... B22D/11/16 |
| JP | 8-57616 | 3/1996 | ........... B22D/11/18 |
| WO | 96-05926 | 2/1996 | ........... B22D/11/10 |

OTHER PUBLICATIONS

Microfilm of the specification and drawings annexed to the request of Japanese Utility Model Application No. 6–4046 (Laid–open No. 63–111248) (Kobe Steel, Ltd.), Jul. 16, 1988, claims; page 3, line 19 to page 4, line 10; Fig. 1 (family: none) mentioned in search report.

* cited by examiner

Primary Examiner—Jay Patidar
(74) Attorney, Agent, or Firm—Kenyon & Kenyon

(57) ABSTRACT

The present invention relates to a continuous casting apparatus for continuously casting molten metal. More particularly, the present invention provides a method and an apparatus for controlling a surface level of molten metal in a mold when molten metal is continuously cast. The continuous casting apparatus of the invention comprises: a mold in which molten metal is poured and solidified; and an eddy current type molten metal surface level sensor for detecting a molten metal surface level in the mold. In the continuous casting apparatus having an electromagnetic coil arranged in such a manner that the electromagnetic coil surrounds the mold and also having an electric power supply for generating a pulse magnetic field from the electromagnetic coil, there are provided a mechanism for taking out a pulse trigger signal corresponding to the magnetic field from the electric power supply, and a mechanism for controlling a time of detecting a surface of molten metal by the molten metal level sensor.

9 Claims, 10 Drawing Sheets

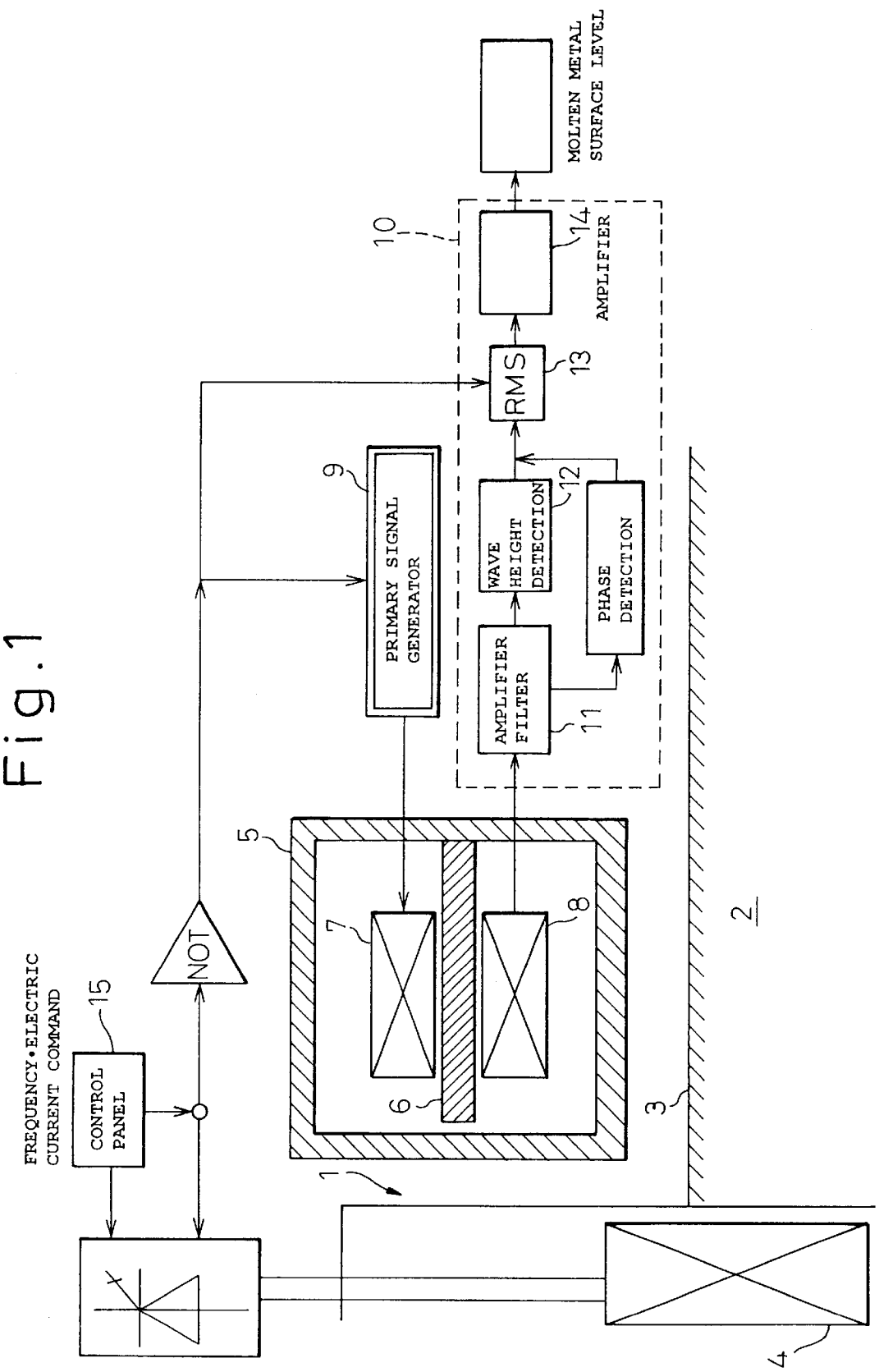

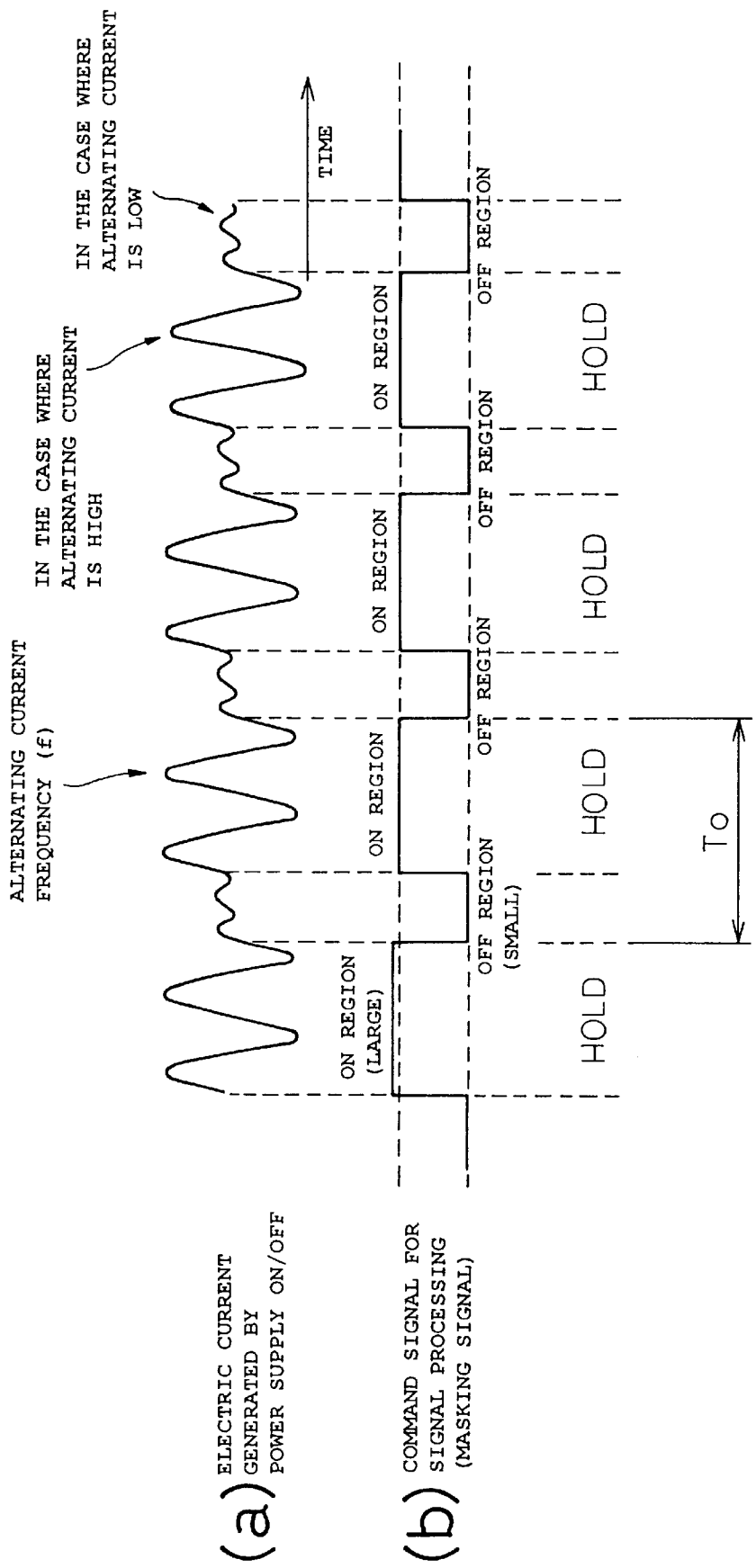

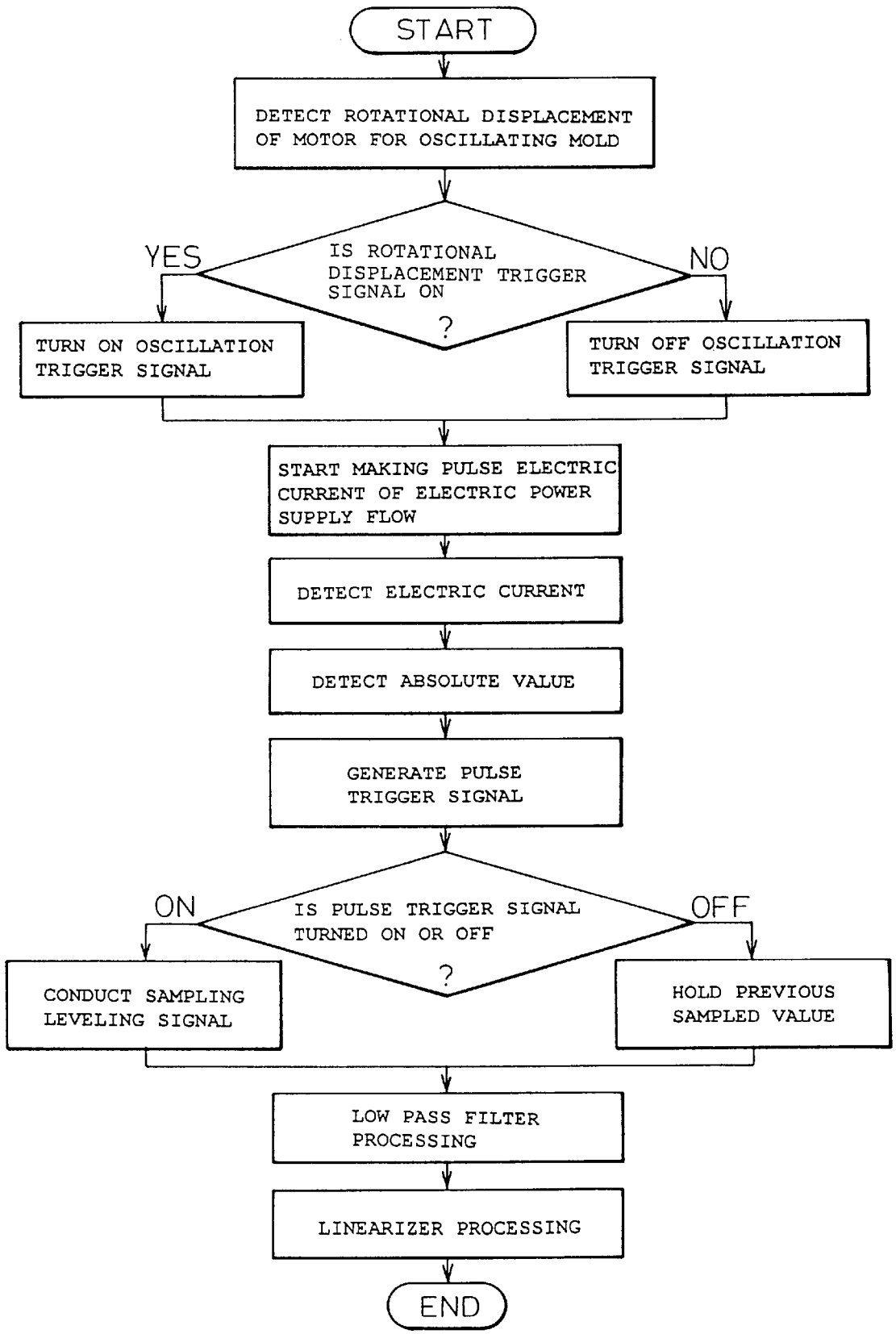

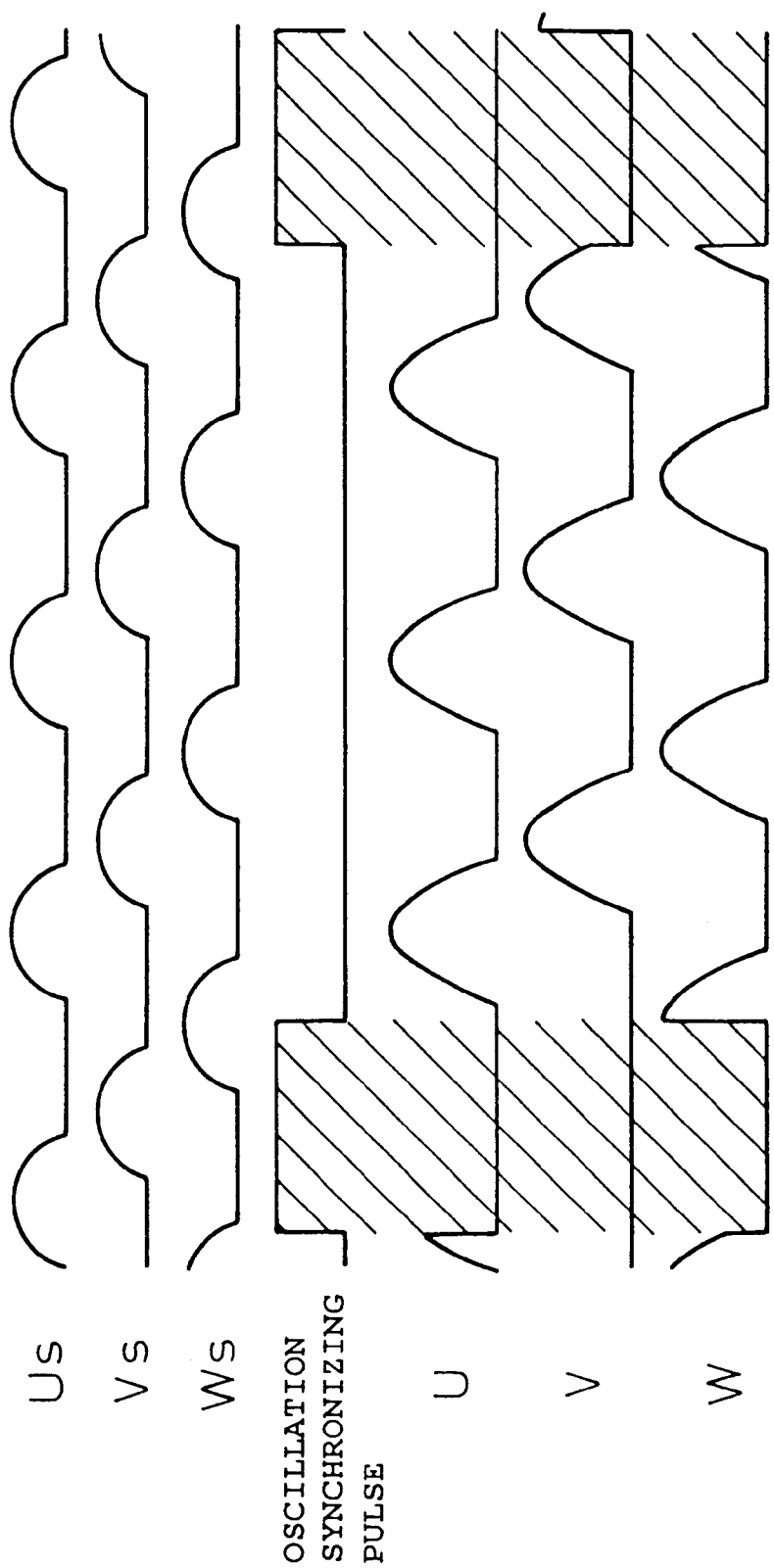

CONTINUOUS CASTING APPARATUS USING A MOLTEN METAL LEVEL GAUGE

FIELD OF THE INVENTION

The present invention relates to a method for measuring a level of a surface of molten metal poured into a mold when molten metal is continuously cast. Also, the present invention relates to a continuous casting apparatus using the same therefor.

DESCRIPTION OF THE PRIOR ART

In general, when molten metal is continuously cast, powder is supplied onto an upper face of a pool of molten metal poured into a mold and then melted by heat of molten metal. Melted powder flows into between mold walls, which are oscillated perpendicularly, and a solidified shell of metal, which is drawn out at a predetermined rate, by a relative motion caused between the mold walls and the solidified shell. A meniscus and an end of the solidified shell are deformed by dynamic pressure generated when molten metal flows into between the mold walls and the solidified shell. This deformation is repeated at a period of the oscillation given to the mold. Therefore, periodic wrinkles, which are called oscillation marks, are formed on a surface of a cast slab. When depths of the wrinkles are large, defects will be caused on the surface of the cast slab. Depending upon a type of steel, only a specific element is segregated at bottom portions of the oscillation marks, or a large number of blowholes are generated and further a quantity of inclusion in the metal is increased, which lowers the yield of products.

On the other hand, when billets or cast bloom, the sectional areas of which are small, are continuously cast, rape seed oil is used instead of the above powder. This rape seed oil burns on the meniscus and becomes graphite, so that it can prevent the solidified shell from seizing onto the mold walls. However, it is difficult to form clear oscillation marks at regular intervals on the surface of the cast bloom. Therefore, stability of continuous casting work and quality of the cast bloom are inferior to those of the method in which powder is used.

Concerning the method for controlling initial solidification, Japanese Unexamined Patent Publication (Kokai) No. 52-32824 discloses the following technique. In the continuous casting method, in which molten metal is poured into a water-cooled mold, which is oscillated periodically, together with lubricant and drawn out downward continuously, there is provided an electromagnetic coil round the mold, and an alternating current is continuously fed to the electromagnetic coil, so that an alternating magnetic field can be formed. An electromagnetic force generated by the alternating magnetic field is given to the meniscus of molten metal poured into the mold. Therefore, the meniscus is curved by the action of the electromagnetic force, so that the surface property of the cast slab can be improved. Further, Japanese Unexamined Patent Publication (Kokai) No. 64-83348 discloses the following technique. When an electromagnetic force is given to molten metal in a mold by an electromagnetic coil, an alternating magnetic field is given like pulses. Due to the foregoing, the electromagnetic force is intermittently given to molten metal in this powder casting method, so that the surface property of the cast piece can be more improved. Furthermore, Domestic Re-publication of PCT International Publication No. 8-805926 discloses the following continuous casting method. In order to give an electromagnetic force, an amplitude of an alternating current is changed in the same manner as that of the frequency of oscillation given to a mold. When frequency (fm) of the mold and frequency (fp) of the alternating magnetic field are set to satisfy the expression $0.69 \leq \ln(fp/fm) \leq 9.9$, wherein in is a constant, the meniscus is stably generated, and the surface property of the cast slab can be more stabilized.

Concerning the method for detecting a level of molten metal, various methods have been developed and carried out. Examples of the method for detecting a level of molten metal are: a conventional method in which a float is used, optical method (photoelectric transfer method), method in which ultrasonic waves or radioactive rays are used, method in which dipped electrodes are used, method in which a thermocouple is used and method of an electromagnetic induction system. Further, as disclosed in Japanese Unexamined Patent Publication (Kokai) Nos. 3-122526, 3-138536, 4-187355 and 4-238661, a method is developed, in which a change in impedance of a receiving coil caused by a change in an eddy current is measured as a change in phase. Japanese Unexamined Patent Publication (Kokai) No. 4-238661 discloses a method in which a changing range of a molten metal surface level is divided into a plurality of portions and measured by a plurality of detectors, and when the detectors are changed over, the molten metal level can be continuously measured.

SUMMARY OF THE INVENTION

However, when the above prior art is actually applied to a continuous casting apparatus into which an electromagnetic induction heating device is incorporated, it is impossible to accurately detect a surface level of molten metal in a mold. When the accuracy of detection of a molten metal surface level is deteriorated, it becomes difficult to control the molten metal surface level. Therefore, it is difficult to stably form a meniscus of molten metal. As a result, the surface property of a cast slab is deteriorated.

On the other hand, as a molten surface level detecting means used for a continuous casting apparatus, an eddy current type molten metal surface level meter is frequently used, to which an electromagnetic induction phenomenon generated by an alternating magnetic field is applied as described above. Other than the above eddy current type molten metal surface level meter, there are provided a method in which a thermocouple embedded in a mold is used and a method in which a permeability type sensor for γ rays is used. However, from the viewpoints of improving the measuring accuracy and response property, the eddy current type sensor is the best sensor. Therefore, the eddy current type sensor is widely used in the process of continuous casting. However, as long as the electromagnetic coil is used in the continuous casting apparatus, an alternating magnetic field generated by the electromagnetic coil acts as noise on the eddy current type molten metal surface level sensor. Therefore, it is impossible to accurately detect a molten metal surface level, and further the measuring accuracy is deteriorated, which is a big problem. This problem is specifically described as follows. For example, when the eddy current type sensor is used in a magnetic field of continuous electromagnetic induction casting in which the intensity is not less than 1000 gauss and the frequency is 200 Hz, the signal output voltage is saturated, and it becomes impossible to conduct measurement. In a magnetic field of pulse electromagnetic induction casting, the signal output voltage is saturated when the magnetic field is turned on. Therefore, it is impossible to measure a molten metal surface level in this saturated condition, which is a serious problem in the measurement of a molten metal surface level.

In order to solve the above problems, the present inventors have paid attention to the following points. In a continuous casting apparatus in which the surface property of a cast slab is improved by generating a pulse magnetic field, a high intensity noise acts on the eddy current type molten metal surface level sensor in a period of time in which pulses are given (the magnetic field is turned on), however, noise seldom acts on the eddy current type molten metal surface level sensor in a period of time in which pulses are interrupted (the magnetic field is turned off). From the above viewpoint, the invention has been accomplished as follows. The period of time in which the magnetic field is turned on and the period of time in which the magnetic field is turned off are periodically repeated and inputted into a signal processing device of the eddy current type molten metal surface level meter or mold-built-in type level meter. In this signal processing device, the molten metal surface level is detected only in the period of time in which the magnetic field is turned off, and the molten metal surface level is not detected in the period of time in which the magnetic field is turned on. Due to the foregoing, it becomes possible to detect a molten metal surface level stably and accurately without being affected by the noise of the magnetic field generated by the electromagnetic coils. The summary of the invention will be described as follows.

(1) A continuous casting apparatus for continuously casting molten metal comprising:

an electromagnetic coil arranged round molten metal in a mold in such a manner that the electromagnetic coil surrounds the mold;

an electric power supply unit for periodically giving a case in which a root-mean-square value of a single phase alternating current is high and a case in which a root-mean-square value of a single phase alternating current is low, to the electromagnetic coil;

a sensor system for detecting a surface of molten metal; and a medium for transmitting information to the sensor system in the case where a root-mean-square value of a single phase current periodically generated by the electric power supply unit is high and also transmitting information to the sensor system in the case where a root-mean-square value of a single phase current periodically generated by the electric power supply unit is low.

(2) A continuous casting apparatus for continuously casting molten metal according to item (1), wherein a value of a molten metal surface level generated by the sensor system is determined by information of the medium for conducting transmission.

(3) A continuous casting apparatus for continuously casting molten metal according to item (1) or (2), wherein a value of a molten metal surface level generated by the sensor system is outputted as information of the medium for conducting transmission only when the alternating current of a single phase is low.

(4) A continuous casting apparatus for continuously casting molten metal according to one of items (1) to (3), wherein the medium for conducting transmission is an electric signal wire.

(5) A continuous casting apparatus for continuously casting molten metal according to one of (1) to (4), the sensor system including:

a primary signal generating device;

a primary sensor coil for generating an electromagnetic field from a current of the primary signal;

a secondary sensor coil for generating a secondary voltage when the secondary sensor coil crosses the electromagnetic field; and a secondary signal processing device for processing a signal of the secondary voltage generated by the secondary sensor coil.

(6) A continuous casting apparatus for continuously casting molten metal according to one of items (1) to (5), wherein an output of the primary signal processing device is turned on and off according to information of the medium for conducting transmission.

(7) A continuous casting apparatus for continuously casting molten metal according to one of items (1) to (5), wherein an output of the secondary signal processing device is turned on and off.

(8) A continuous casting apparatus for continuously casting molten metal according to one of items (1) to (7), wherein an output of the electric power supply unit is zero when an intensity of a single phase alternating current of the electromagnetic coil is low.

(9) A continuous casting apparatus for continuously casting molten metal according to one of items (1) to (8), wherein one period $T_o$ is $30 \leq T_o \leq 300$ (m·sec) where $T_o$ is one period in the case where an intensity of a single phase alternating current of the electromagnetic coil is high and low, and a period of the single phase alternating current f is $60 \leq f \leq 400$ (Hz).

BRIEF DESCRIPTION OF THE DRAWINGS

FIG. 1 is an arrangement view showing an outline of a molten metal surface level meter used for continuous casting according to the present invention.

FIG. 2 is a view showing waveforms, wherein (a) shows an electric current waveform of an electromagnetic coil of an electromagnetism generating device, and (b) shows a waveform of masking.

FIG. 4 is a flow chart showing a procedure of operation for carrying out a continuous casting method of the present invention.

FIG. 10 is a time chart showing changes in time series of input $U_s$, $V_s$, $W_s$ to an electric power supply circuit shown in FIG. 9 and also showing changes in time series of output voltages U, V, W.

BEST MODE FOR CARRYING OUT THE INVENTION

Figure 3A:
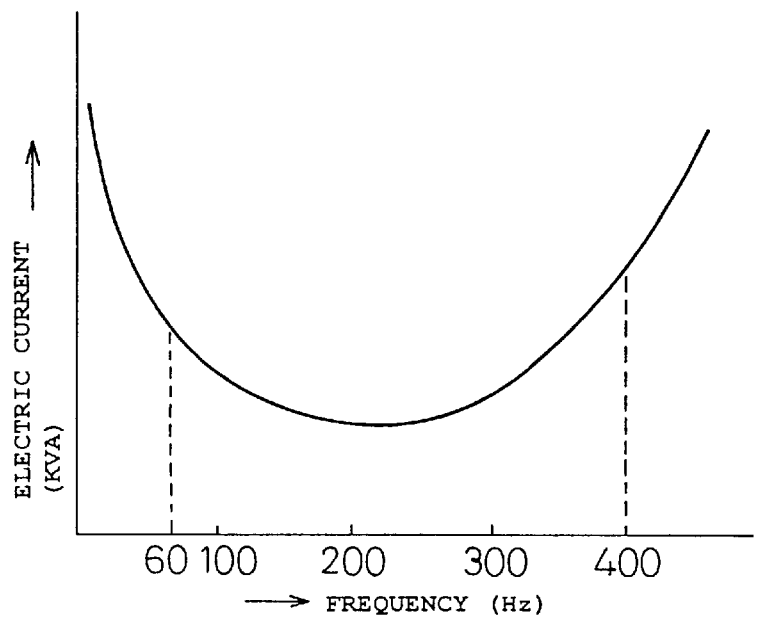
FIG. 3(a) is a diagram showing a relation between the frequency and current.

By referring to the appended drawings showing an outline of the present invention, the present invention will be explained below.

FIG. 1 is an arrangement view showing an outline of a molten metal surface level meter used for continuous casting according to the present invention. In FIG. 1, there is provided a magnetism generator 4 in the periphery of the outside of a mold 1 at a position corresponding to a surface 3 of molten metal 2 in a mold 1. Molten metal 2 in the mold 1 is agitated by an alternating current generated by the magnetism generator 4, that is, convection of molten metal 2 is caused. Right above the surface 3 of molten metal 2, there is provided a molten metal surface level sensor 5 for measuring a molten metal surface level. Usually, an eddy current type level meter or a level meter built in a mold is used for the molten metal surface level sensor 5. This molten metal surface level sensor 5 is composed of a primary coil 7 and a secondary coil 8, which are arranged in parallel with the molten metal surface, and a piece of conductive ferromagnetic substance 6 is interposed between the primary coil 7 and the secondary coil 8. When the molten metal surface level is measured by the molten metal surface level sensor 5 under the above condition, the following problems may be encountered. As long as an electromagnetic coil is used, an alternating magnetic field generated by the electromagnetic coil arranged in the electromagnetism generator 4 acts on the molten metal surface level sensor 5 as noise. Accordingly, it is impossible to accurately detect the molten metal surface level, and further the measurement accuracy is deteriorated.

In order to remove the above noise and measure the molten metal surface level stably, the present inventors took the following countermeasures. As shown in FIG. 2, an electric current generated by the electric power supply has a waveform which changes periodically between ON and OFF via the electromagnetic coil. In the ON state, an alternating magnetic field is generated by the electromagnetic coil, and in the OFF state, no alternating magnetic field is generated. The present inventors aim at the above phenomenon. Therefore, it was decided to operate the electromagnetism generator 4 in a pattern of ON and OFF. In accordance with the operation conducted by the pattern of ON and OFF of the electromagnetism generator 4, ON/OFFs were conducted in parallel to each other as shown by (b), that is, in the case of ON pattern of the electromagnetism generator 4, masking was done, and only in the case of OFF pattern of the electromagnetism generator 4, a signal generated by the molten metal surface level sensor 5 was processed so as to measure the molten metal surface level. That is, an electric current was periodically supplied to the electromagnetic coil in the electromagnetism generator 4. While the electric current was being supplied, preferably when the electric current of the electromagnetic coil was turned on, a direction of the rotary magnetic field was changed between the normal and the reverse direction. An arbitrary number of periods, in which the electric current was turned off, were provided. Next, periodic supply of electric current is repeated. Only in a period of time of OFF, was the molten metal surface level measured and outputted by the eddy current type level gauge or the level gauge built in the mold. In this way, the molten metal surface level can be accurately measured in this way at all times. Processing necessary for measurement is specifically explained as follows.

A primary signal is sent from the primary signal generator 9 to the primary coil of the molten metal level sensor 5. This primary signal may be sent intermittently or continuously. The primary signal is amplified by the conductive ferromagnetic substance 6 and transmitted to the secondary coil 8, and a secondary signal is emitted. This secondary signal is sent to the secondary signal processing mechanism 10 and processed. This secondary signal processing mechanism 10 includes: an amplifier filter 10 for amplifying the signal; a detector 11 for conducting peak value detection or phase detection; RMS 12; and an amplifier 13. This secondary signal processing mechanism 10 conducts processing of the secondary signal. Further, the secondary signal processing mechanism 10 conducts processing of the signal according to a masking signal. On the other hand, from the control section 15 for controlling the frequency of an electric current supplied to the electromagnetic coil, a command of ON region or OFF region is sent according to a trapezoidal waveform in addition to a normal sine waveform. In the present invention, it is preferable that the control section 15 repeatedly conducts controlling in such a manner that the electric current of the electromagnetic coil is turned on in 1 to 5 periods, and while the electric current is being turned on, an arbitrary number of OFF times are provided, and then the electric current of the electromagnetic coil is turned on in 1 to 5 periods. In this case, only when the electric current is turned off, can controlling be started. When the electric current of the electromagnetic coil is turned off, operation is conducted under the condition that a low intensity of electric current is turned on so that there is no interaction between the electromagnetic coil and the eddy current level gauge or the level gauge built into the mold cannot be caused. Due to the foregoing, it becomes possible to measure the molten metal surface level while an intensity of noise is further reduced. The command of the control section 15 is further sent to the primary signal generator 9 and RMS 12, and information processing for measuring the molten metal surface level is carried out when the electric current is turned off.

Figure 3B:
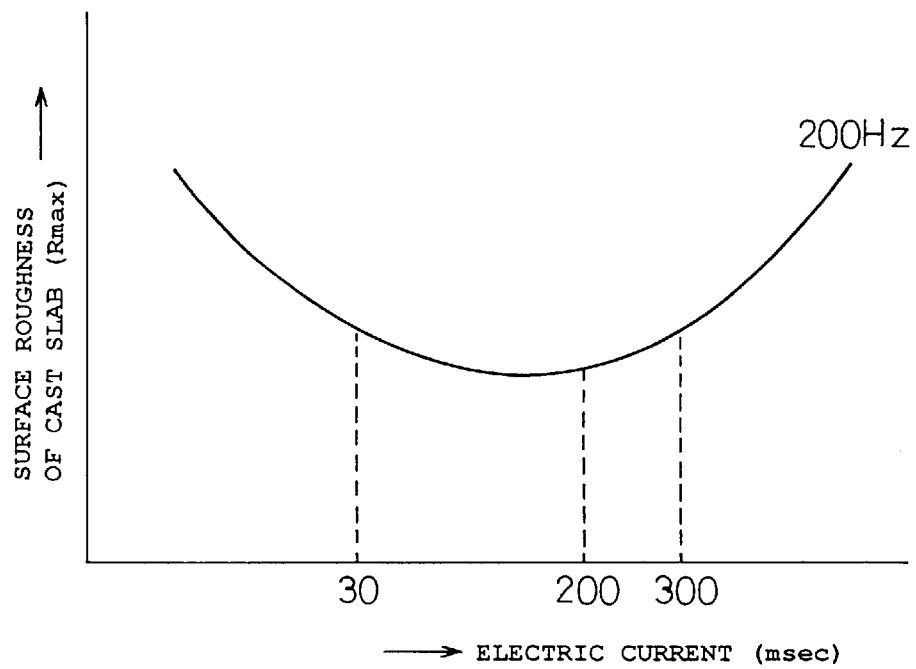
FIG. 3(b) is a diagram showing a relation between pitch ($T_o$) of turning on/off of electric current and surface roughness of a cast slab.

Especially, in the present invention, it is preferable that the electric current is turned on while frequency (f) and pitch ON/OFF of supplying the electric current satisfy the expressions of $60 \leq f \leq 400$ (Hz) and $30 \leq To \leq 300$ (msec). As shown in FIG. 3(a), in the present invention, an intensity of noise becomes minimum when the frequency is approximately 200 Hz according to a relation between the frequency and the electric current. When a relation between surface roughness ($R_{max}$) of a cast piece and ON/OFF pitch of supplying the electric current is checked at the frequency of 200 Hz, as can be seen in FIG. 3(b), when pitch ($T_o$) of supplying the electric current is 200 msec, surface roughness of a cast piece is remarkably improved. Accordingly, from the viewpoint of improvement in surface roughness of a cast piece, it is preferable that the electric current is made to flow while ON/OFF pitch ($T_o$) supplying the electric current is kept in the range of 30 to 300 msec. In this connection, when $T_o$ is not more than 30 msec or not less than 300 msec, it is impossible for the molten metal surface level gauge to follow a change. Therefore, it is preferable that the setting of ON/OFF pitch is determined as described above.

Further, in the present invention, when a variable coil and a masking device are added onto the secondary coil side of the eddy current level meter or the level meter built in the mold, it is possible to detect the molten metal surface level accurately without being affected by the alternating magnetic field noise generated by the electromagnetic coil.

FIG. 4 is a flow chart showing a procedure of a highly accurate operation of continuous casting in which no noise is generated in an alternating magnetic field.

In the method of controlling a molten metal surface according to the present invention, in order to generate an oscillation trigger signal from the mold oscillating device, a rotational displacement of the motor for oscillating the mold is detected, and it is judged whether or not the rotational displacement is in a state in which the oscillation trigger signal is turned on. When the rotational displacement is in a state in which the oscillation trigger signal is turned on, the oscillation trigger signal is turned on. When the rotational displacement is not in a state in which the oscillation trigger signal is turned on, the oscillation trigger signal is turned off. When the oscillation trigger signal is turned off, the electric power supply unit stops supplying the electric current. When the oscillation trigger signal is turned on, a pulse electric current starts flowing. Detection of the pulse electric current is conducted on the detected electric current signal in the absolute value detection circuit, and a pulse trigger signal is generated in the calculation device. Next, it is judged whether or not the pulse trigger signal is turned on or off. When the pulse trigger signal is in an ON state of, sampling is conducted on the level signal. On the other hand, when the pulse trigger signal is in a state of OFF, the sampling value, which was measured at the last time, is held, and sampling is not conducted. The thus obtained sampling and holding signals of the molten metal surface level are subjected to low pass filter processing and linearizer processing, and then transmitted to the next molten metal surface level control system. In this way, molten metal surface level control is carried out.

Next, referring to FIG. 5, an overall arrangement of the molten metal level control device of the continuous casting apparatus for continuously casting molten metal of the present invention will be explained in detail as follows.

Figure 5:
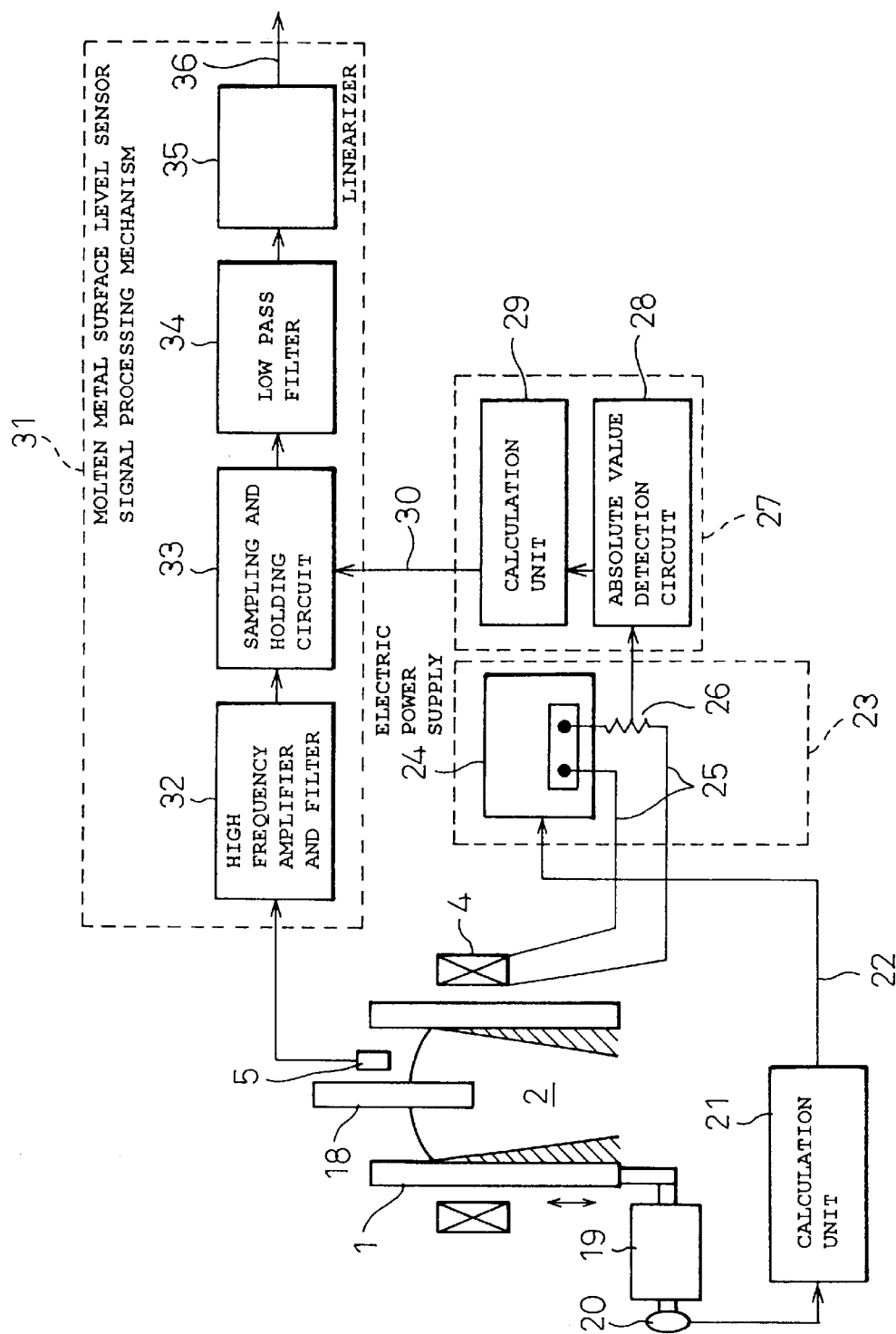
FIG. 5 is a view showing an overall arrangement of a molten metal surface level control unit in a continuous casting apparatus for casting molten metal to realize the present invention.

In FIG. 5, molten metal 2 is cast from a casting nozzle 18 into a mold 1 used for continuous casting. In the mold 1, there is provided a mold oscillating device 19 for oscillating the mold 1 perpendicularly. There is provided an electromagnetic coil 4 which surrounds the mold 1. When a pulse-like alternating current is made to flow in the electromagnetic coil 4, molten metal is given an electromagnetic force and a stable meniscus is formed. On the other hand, right above the molten metal surface, there is provided a head section 5 of the eddy current type molten metal level sensor. A level of the molten metal surface in the mold is measured at all times by the head section 5.

In the molten metal surface level control device of the present invention, an oscillation trigger signal is generated by the mold oscillating device 6. Therefore, a rotary encoder 20 is attached to a motor shaft (not shown in the drawing) of the mold oscillating device 6, and a rotational displacement of a motor (not shown in the drawing) is detected by the rotary encoder 20. Then, an oscillating trigger signal 22 is generated by a calculating device 21 connected to the rotary encoder 20 on the basis of calculation of comparison in which existing data of a rotational displacement, at which the trigger signal must be outputted, is compared with actual data of the rotational displacement which has been taken out. This oscillation trigger signal 22 is transmitted to the electric power supply unit 23 which starts operation of the electromagnetic coil 4. Then, according to the oscillation trigger signal 22, the electric power supply 24 of the electric power supply unit 23 makes a pulse-like alternating electric current flow in an exciting coil, so that a pulse magnetic field can be generated.

There is provided an electric current sensor 26 on a cable 25 between the electric power supply 24 and the electromagnetic coil 4. An electric current signal is detected by this electric current sensor 26. The thus detected electric current signal is subjected to absolute value detection in the absolute value detection circuit 28 arranged in the pulse trigger signal taking-out mechanism 27. Further, a pulse trigger signal 30 is generated by the calculation device 29 so that sampling can be conducted at the time at which the pulse magnetic field is turned off, and the thus generated pulse trigger signal 30 is transmitted to a molten surface level sensor signal processing mechanism 31. This molten surface level sensor signal processing mechanism 31 includes: a high frequency amplifier and filter 32, sampling and holding circuit 33, low pass filter 34, and linearizer 35. These units sample or hold a signal according to the pulse trigger signal 30. Due to the foregoing, a time signal in the molten metal surface level signal is removed, which has been detected by the eddy current type molten metal surface level sensor head section 5, containing noise generated by the electromagnetic coil 4. The molten metal surface level signal from which noise has been removed in this way is subjected to the processing of the low pass filter 34 and the linearizer 35, so that the accurate molten metal surface level signal can be transmitted to the molten metal surface level control system 36. In this way, the molten metal surface level can be highly accurately controlled.

Next, the mold sliding operation conducted in the apparatus of the present invention will be explained as follows. An object of sliding the mold is that powder is uniformly poured into the mold by giving a periodic pinching force and that generation of oscillation marks is suppressed or stopped.

Figure 6:
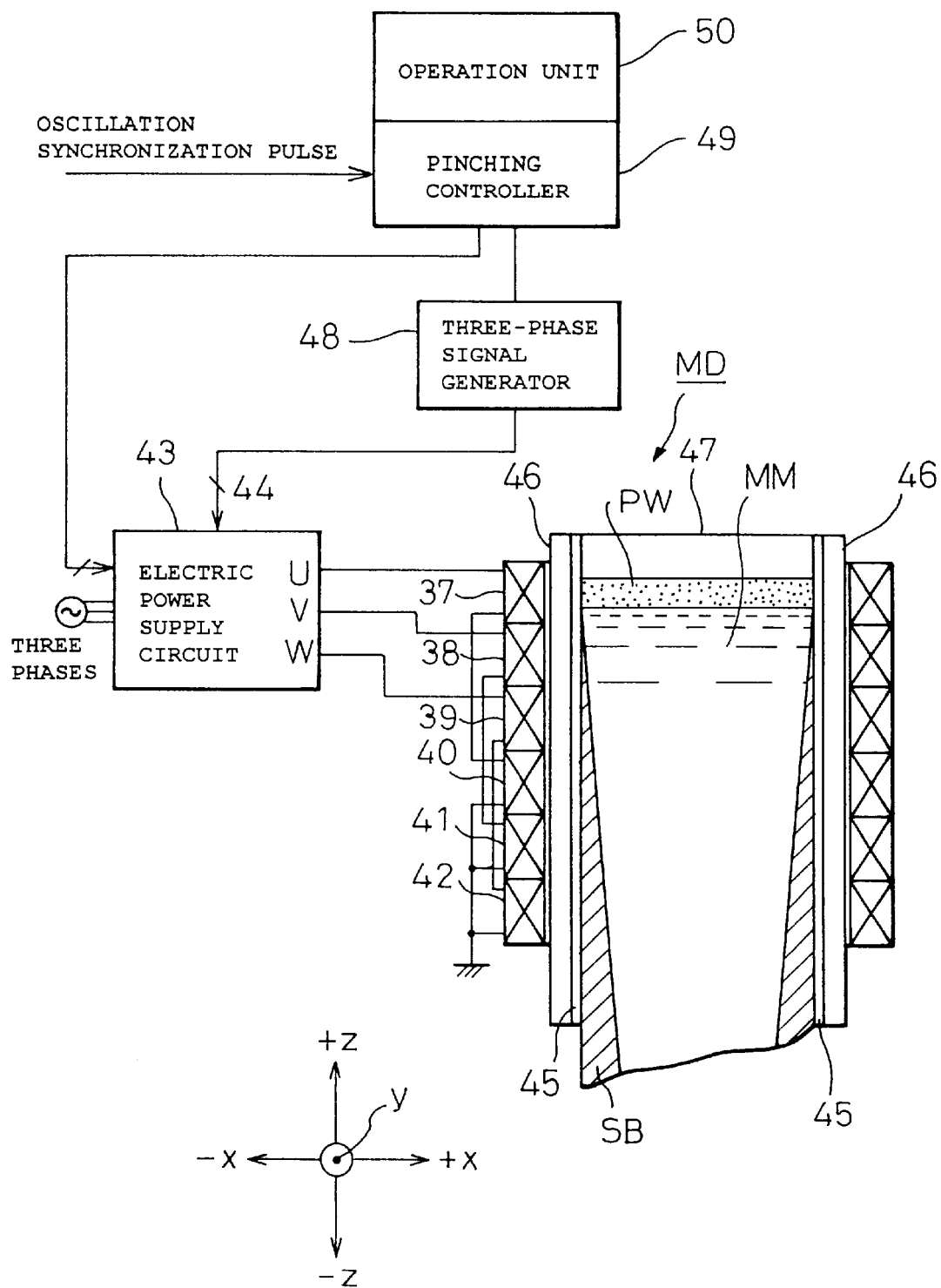
FIG. 6 is a block diagram showing an arrangement of a mold sliding device used in an embodiment of the present invention, wherein a longitudinal cross-sectional view of mold MD is shown.

FIG. 6 is a longitudinally cross-sectional view of continuous casting mold MD into which an embodiment of the present invention is incorporated. Mold MD is composed of two long sides 46, 46, which are opposed to each other, and two short sides 47, 47 which are interposed between the two long sides. Molten metal is poured into mold MD from top to bottom via an injection nozzle not shown in the drawing. A meniscus (upper surface) on molten steel MM in the mold is covered with powder PW. Mold MD is cooled by cooling water flowing into a water box and a water passage arranged in the mold. Therefore, molten steel MM poured into mold MD is gradually solidified from a surface which comes into contact with mold MD, and cast slab SB is continuously drawn out. However, since molten steel MM is continuously poured into the mold, the mold is filled with molten steel MM at all times.

Around this mold MD, six electric coils 37 to 42, which are distributed in the direction of z in such a manner that the six electric coils turn round the vertical axis (z), are wound. When electric power is supplied to the electric coils 37 to 42, a pinching force (coagulation force) corresponding to an electric current flowing in each coil acts on molten metal located at a level in the vertical direction z of each coil. Therefore, a distribution of molten metal MM in the directions of x and y contracts in a direction which is directed to the z-axis. Since the distribution of molten metal MM contracts as described above, the meniscus swells. Accordingly, a clearance is generated and extended between the solidified shell of molten metal MM on the outside at the level (in the direction of z) on which the pinching force acts, and the inner surface of the mold. As a result, powder enters the clearance.

In this embodiment, by the three-phase electric power circuit 43, the electric coils 37 to 42 are impressed with three-phase pulse voltages U, V, W which are synchronized with signals $U_s$, $V_s$, $W_s$ given by the three-phase signal generator 48. A delay of 120° is caused among signals $U_s$, $V_s$ and $W_s$.

The three-phase signal generator 48 houses data expressing a voltage of each phase angle of half period (phase angle 0 to 179°) of alternating voltage. The three-phase signal generator 48 includes: ROM for generating a half wave of the sine wave; phase counter; three latches used for outputting signals $U_s$, $V_s$ and $W_s$; three D/A converters for converting data for latch used for outputting into an analog voltage; and a reading control circuit for reading half wave voltage data $U_s$, $V_s$, $W_s$ of three phases according to the clock pulse count values of the phase angle counter and for latching to three latches used for outputting of the phases.

The phase counter is a circulation counter operated in such a manner that clock pulses given by the pinching controller 49 are counted from 0, and when the counted value becomes 360, the counted value is initialized and then counting operation is started again at this point of time.

The reading control circuit is operated as follows. At the time when a clock pulse is generated and the phase angle counter completes counting up by one corresponding to the generation of the clock pulse, a counted value of the phase angle counter is checked. When the counted value is in the range from 0 to 179, voltage data corresponding to the counted value (phase angle) is read out from ROM and latched to the first phase $U_s$ of the three output latches to $U_s$, $V_s$ and $W_s$. When the counted value is 180, the latch concerned is cleared, and while the counted value is 181 to 360, the cleared state is kept, that is, an output value of 0 is kept. Next, a value obtained when 120 is subtracted from the counted value is checked (when the value obtained by subtracting 120 from the counted value is negative, 360 is added to the value). When this value is in the range from 0 to 179, voltage data corresponding to the subtracted value is read out from ROM and latched so that it can be directed to the second phase $V_s$ of output latch. When the subtracted value is 180, the latch is cleared, and this cleared state is kept in the range from 181 to 360. Then, a value obtained when 240 is subtracted from the counted value is checked (when the value obtained by subtracting 240 from the counted value is negative, 360 is added to the value). When this value is in the range from 0 to 179, voltage data corresponding to the subtracted value is read out from ROM and latched so that it can be directed to the third phase $W_s$ of output latch. When the subtracted value is 180, the latch is cleared, and this cleared state is kept in the range from 181 to 360.

Figure 8:
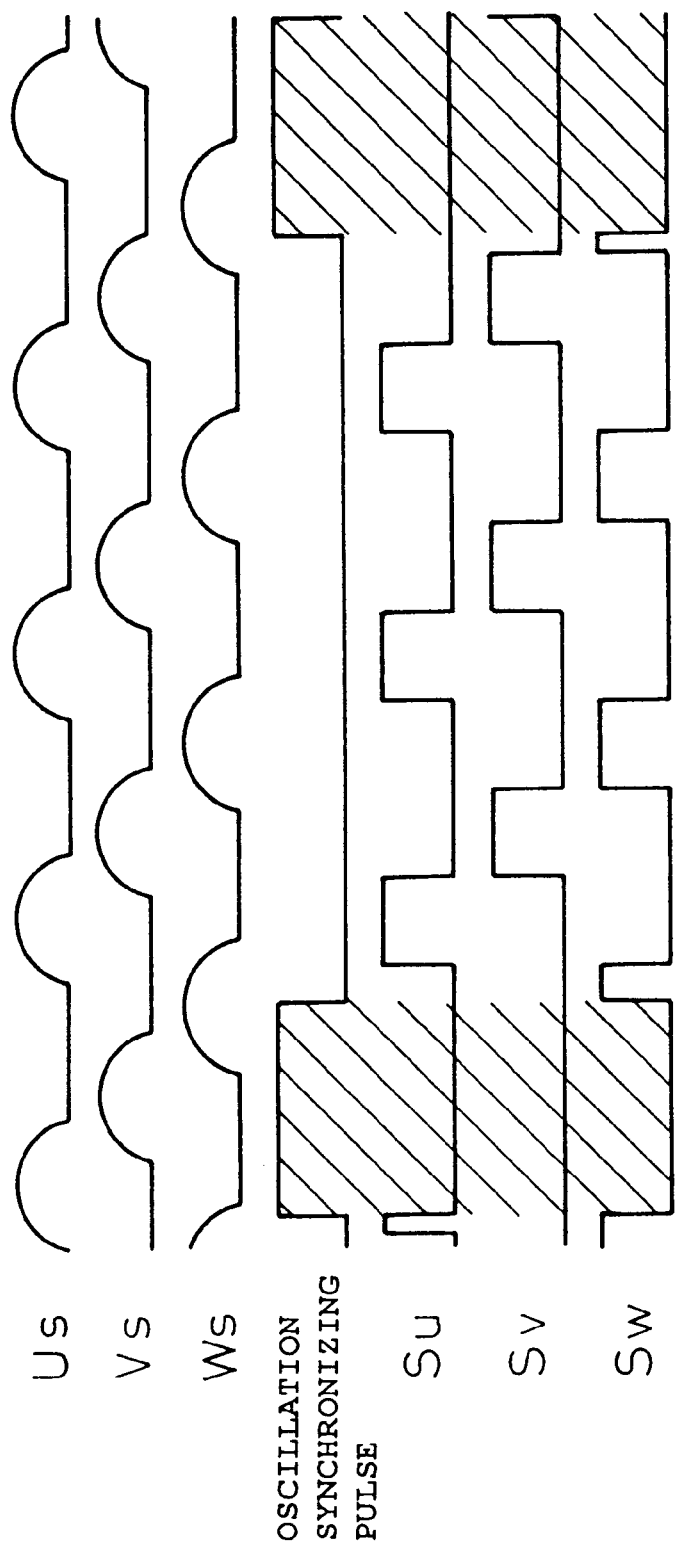
FIG. 8 is a time chart showing changes in time series of input $U_s$, $V_s$, $W_s$ to an electric power supply circuit shown in FIG. 7 and also showing changes in time series of electric output control signals $S_u$, $S_v$, $S_w$.

These latch data are converted into analog voltages, which are analog signals $U_s$, $V_s$, $W_s$ shown in FIG. 8, by D/A converters and impressed upon the three-phase electric power circuit 43.

Analog signals $U_s$, $V_s$, $W_s$ are only positive half waves of the respective phase voltages of the three-phase alternating signals. The frequency of this three-phase alternating current is 1/360 of the frequency of the clock pulse, that is, the frequency of this three-phase alternating current is determined by the frequency of the clock pulse. This clock pulse is given to the three-phase signal generator 48 when the pinch controller 49 generates it corresponding to the drive frequency which has been inputted by an operator via the control panel 50. In this case, (clock pulse frequency)=(drive frequency designated by operator)×360.

Figure 7:
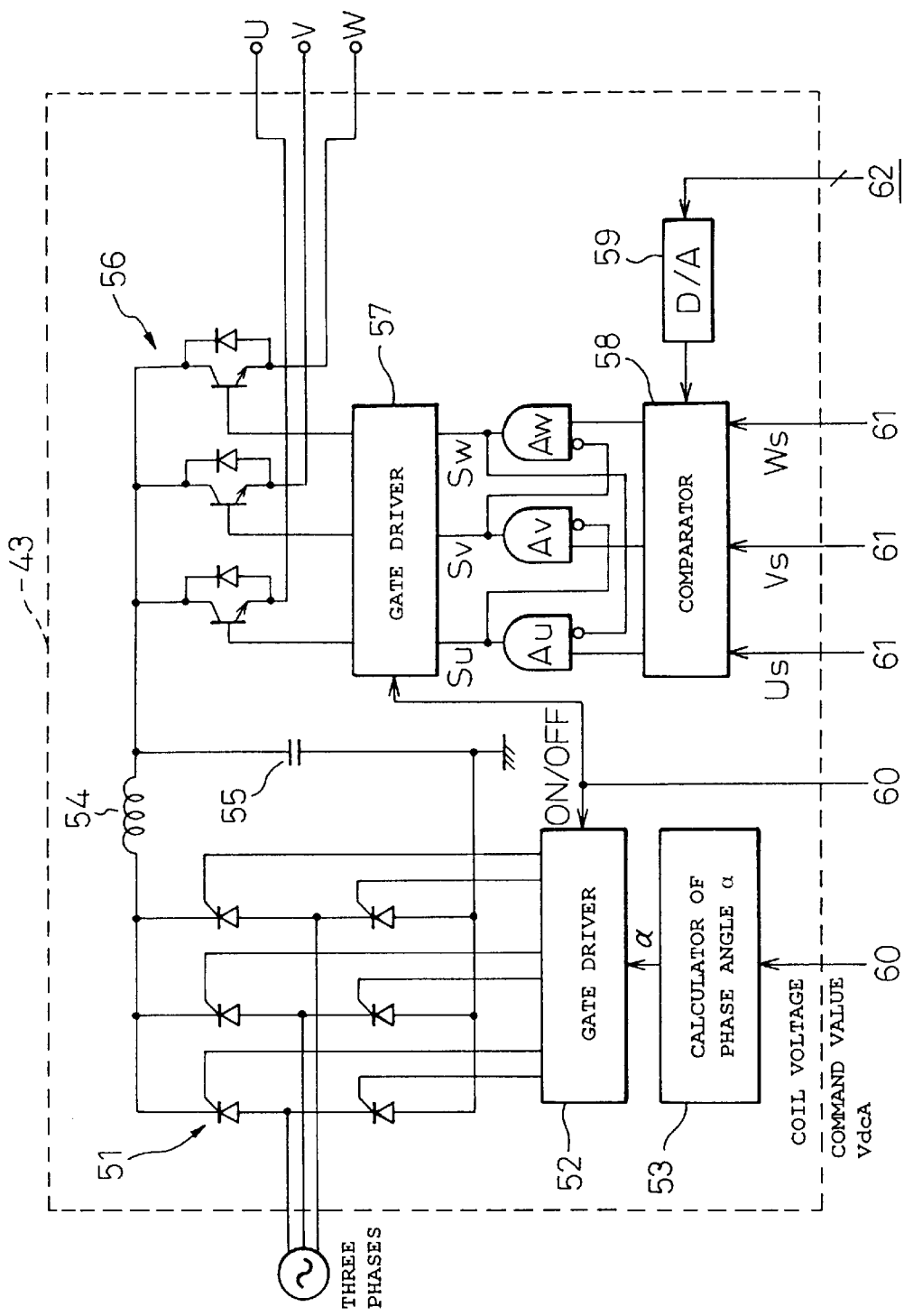
FIG. 7 is a block diagram showing an arrangement of an electric power supply circuit shown in FIG. 6.

FIG. 7 is a view showing an arrangement of the three-phase electric power supply circuit 43. A thyristor bridge 51 used for rectification from AC to DC is connected to the three-phase alternating electric power supply. An output of the thyristor bridge 51, that is, a pulsating current of the thyristor bridge 51 is smoothed by the inductor 54 and the condenser 55. The thus smoothed DC voltage is impressed upon the power transistor switching circuit 56 for outputting the three-phase pulses. U-phase voltage (pulse) of three-phase pulses, which is outputted from the power transistor switching circuit 56, is impressed upon the electric coils 37, 38 shown in FIG. 6, and V-phase voltage is impressed upon the electric coils 38, 41, and W-phase voltage is impressed upon the electric coils 39, 42.

Coil voltage command VdcA is given from the pinching controller 49 to the phase angle α calculator 53. The phase angle α calculator 53 calculates a continuity phase angle α (thyristor trigger phase angle) corresponding to command VdcA. A signal expressing this continuity phase angle α is given to the gate driver 52. The gate driver 52 starts phase-counting at the zero-cross point of each phase, and the thyristor of each phase is triggered at phase angle α so as to accomplish electric continuity. Due to the foregoing, DC voltage shown by command VdcA is impressed upon the switching circuit 56.

On the other hand, phase voltages $U_s$, $V_s$, $W_s$ which are given by the three-phase signal generator 48 are given to the comparator 58. A threshold value voltage (analog voltage) is given to the comparator 58 by D/A converter 59. Threshold value data is given to D/A converter 59 by the controller 49. D/A converter 59 converts this threshold value data into an analog voltage.

When U-phase signal $U_s$ is not less than the threshold voltage, the comparator 58 outputs a signal of high level H (transistor is on) to U-phase (to the transistor for outputting U-phase), and when U-phase signal $U_s$ is lower than the threshold voltage, the comparator 58 outputs a signal of low level L (transistor is off) to U-phase (to the transistor for outputting U-phase). Concerning V-phase signal $V_s$ and W-phase signal $W_s$, the same operation is carried out. In this embodiment, in order to prevent the three-phase switching transistors, the number of which is not less than two, from being turned on at the same time, there are provided AND gates $A_u$, $A_v$ and $A_w$. In the case where overlapping is caused at high levels H of signals $U_s$, $V_s$, $W_s$, sine wave signals $U_s$, $V_s$, $W_s$ are formed into pulse signals $S_u$, $S_v$, $S_w$ and given to the gate driver 57 so that a signal, which becomes H later, can become H after a signal, which has become H before, is changed over to L.

According to the thus formed three-phase pulse signals $S_u$, $S_v$, $S_w$, the gate driver 57 turns on the corresponding switching transistor (56) only while the signals are H. Due to the foregoing, U-phase pulse voltage of the three-phase pulse voltage is outputted to electric power supply connection terminal U of the electric power supply circuit 43. The same V-phase pulse voltage is outputted to electric power supply connection terminal V, and the same W-phase pulse voltage is outputted to electric power supply connection terminal W. Levels of these pulse voltages are determined by coil voltage command VdcA.

In this connection, the gate driver 57 outputs a voltage according to ON/OFF signal of electric power supply output given by the pinching controller 49, that is, when the signal indicates ON, a voltage is outputted as described above. However, when the signal indicates OFF, voltage is not outputted.

FIG. 6 is referred to again. The pinching controller 49 is connected to the operation panel 50 which is used when an operator inputs data and also used when data is outputted to the operator. The pinching controller 49 is a computer system mainly composed of a CPU. A clock pulse, the frequency of which is (drive frequency)×360, inputted onto the operation panel 50 by the operator is given to the three-phase signal generator 48. An electric power supply output ON/OFF signal, coil voltage command VdcA and threshold value data are given to the three-phase electric power supply circuit 43.

The pinching controller 49 is connected to a computer (host computer) used for controlling casting operation (not shown) via communication lines. The pinching controller 49 receives an oscillation synchronizing pulse from the host computer and outputs data showing whether or not pinching is being driven to the host computer and the operation panel 50, and also outputs data showing a driving state to the host computer in the case where pinching is being driven.

In this connection, an oscillation device not shown is attached to mold MD. The host computer commands the oscillation device so that the mold can be oscillated, and an oscillation synchronizing signal is given to the pinching controller 49 by the oscillation device. The oscillation synchronizing signal is a pulse signal, the level of which is a high level H in the period from when mold MD starts being driven upward to when mold MD returns to a lower position (initial position). One pulse of H represents a period in which mold MD is reciprocated in the direction of z. L in the pulse of H represents an oscillation stopping period in which the mold is not moved upward and downward.

When the electric power supply is turned on, the pinching controller 49 sets the inner register, counter, timer and input and input and output port at a waiting condition and displays a sign of "ready" on the control panel 50 and informs the host computer of the "ready" and waits for the arrival of input of data or control command. When data has been inputted, it is housed in a register corresponding to the type of data. Then, the pinching controller 49 waits for the arrival of a command of start.

When a pinching drive start command has been given by the operator or the host computer, the pinching controller 49 gives a drive condition data, which has been inputted from the control panel 50 or the host computer, to the three-phase signal generator 48 and the three-phase electric power supply circuit 43 and starts outputting the clock pulse and directs the three-phase electric power supply circuit 43 to turn on the output of electric power. In response to this command, the three-phase electric power supply circuit 43 applies the three-phase pulse voltages upon the electric coils 37 to 42. Due to the foregoing, the electric coils 37 to 42 give a pinching force to molten steel MM in the mold. After the start of pinching drive, the pinching controller 49 is synchronized with an oscillation synchronizing pulse. When the oscillation synchronizing pulse is changed over from L to H, the ON/OFF signal given to the gate drivers 52, 52 of the electric power supply circuit 43 is changed over to a level of command of OFF. When the oscillation synchronizing pulse is changed over from H to L, the ON/OFF signal is changed over to a level of command of ON.

FIG. 8 is a view showing changes in time series of the input signals $U_s$, $V_s$, $W_s$ (output signals of the three-phase signal generator 48) of the three-phase electric power supply circuit 11 and also showing changes in time series of the input signals $S_u$, $S_v$, $S_w$ of the gate driver 57. In this connection, while signal $S_u$ is H, a voltage of the condenser 55 (output voltage U) is applied to the electric coils 37, 40. While signal $S_v$ is H, a voltage of the condenser 55 (output voltage V) is applied to the electric coils 38, 41. While signal $S_w$ is H, a voltage of the condenser 55 (output voltage W) is impressed upon the electric coils 39, 42. In this embodiment, pulse voltages of phases U, V and W of the three-phase pulse voltages are applied upon the electric coils 37 to 39 in this order. Therefore, the pinching force is repeatedly moved in the direction −z which is a direction of depth of molten metal MM. This pinching drive is stopped while mold MM is being oscillated (one reciprocating motion in the perpendicular direction z; oscillation synchronizing signal is H) as shown by the hatched regions in FIG. 8.

Accordingly, in this embodiment, when mold MM is oscillated by one reciprocating motion in the direction z, mold MM is moved in the perpendicular direction by one reciprocating motion with respect to molten metal and a solidified shell on the surface of molten metal. Therefore, mold and molten metal including the solidified shell are separated from each other. Immediately after that, molten metal MM is given a pinching force and moved in the direction of −z. Due to the foregoing, molten metal MM conducts an oscillatory motion downward. By the oscillation of an end portion of mold MM, powder which has been trapped between the mold and molten metal and also powder located on a tangent of the meniscus and the inner face of the mold is drawn into a boundary between the inner face of the mold and molten metal, and the mold is driven downward. By the oscillatory motion of molten metal MM, powder located on the boundary between the inner face of the mold and molten metal can be somewhat uniformly distributed in the direction of −z, that is, an effect of making the distribution of powder uniform can be provided.

Figure 9:
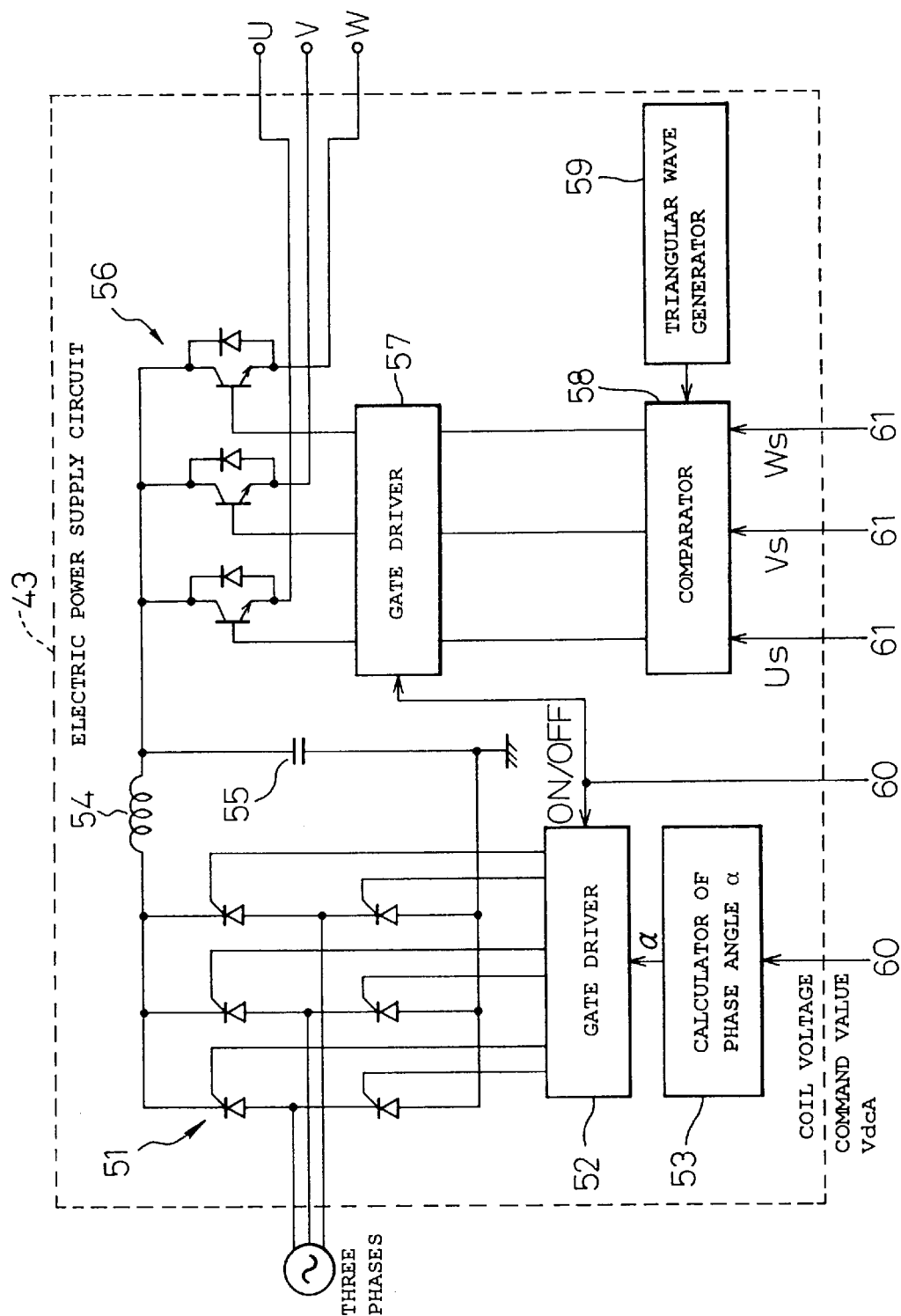
FIG. 9 is a block diagram showing an arrangement of an electric power supply circuit of another mold sliding device used in an embodiment of the present invention.

An outline of the structure of another embodiment is the same as that the embodiment shown in FIG. 6. The only different point from the above embodiment is that the structure of the three-phase electric power supply circuit 43 is formed as shown in FIG. 9. In this embodiment, in the three-phase electric power supply circuit 43 shown in FIG. 9, AND gates $A_u$, $A_v$, $A_w$ provided in the above embodiment are not provided, and a sawtooth wave generator 59 is used instead of D/A converter 59. This sawtooth wave generator 59 gives a sawtooth wave voltage to the comparator 58. When the three-phase half wave signals $U_s$, $V_s$, $W_s$ are not lower than the sawtooth wave voltage, the comparator 58 generates a PWM pulse of high level H directed to the phases of U, V, W of 3 kHz, and when the three-phase half wave signals $U_s$, $V_s$, $W_s$ are lower than the sawtooth wave voltage, the comparator 58 generates a PWM pulse of low level L directed to the phases of U, V, W of 3 kHz. The thus generated PWM pulse is given to the gate driver 57. In the same manner as that of the first embodiment, when ON/OFF signal is at the level of directing ON, the gate driver 57 turns on the transistor directed to phase U of the switching transistor circuit 56 while a PWM pulse directed to phase U is H, and the gate driver 57 turns off the transistor directed to phase U of the switching transistor circuit 56 while a PWM pulse directed to phase U is L. Concerning the phases V and W, the same operation is carried out.

However, since an H duty ratio, which is (time in section H)/(one period of 3 kHz), of a PWM pulse is proportional to the levels of three-phase half wave voltages $U_s$, $V_s$, $W_s$, sine curves are substantially drawn by the average values of voltages U, V, W applied upon the electric coils. That is, they are substantially sine curves.

FIG. 10 is a view showing changes in time series of the input signals $U_s$, $V_s$, $W_s$ (output signals of the three-phase signal generator 48) of the three-phase electric power supply circuit 43 (shown in FIG. 9) and also showing changes in time series of the voltages U, V, W (average values) applied upon the electric coils 37 to 42.

In this embodiment, three-phase alternating half wave voltages are applied upon the electric coils 37 to 42. Therefore, the pinching force can be more smoothly moved in the direction of −z than the above embodiment. That is, the oscillatory motion of molten metal is conducted stepwise in the above embodiment, however, the oscillatory motion of molten metal is conducted continuously in this embodiment.

INDUSTRIAL APPLICABILITY

As explained above, in the present invention, while an alternating current flows in the electromagnetic coil, the ON/OFF pitch of the alternating current is controlled, that is, preferably, when the alternating current is turned on, rotation is conducted normally and reversely, and an arbitrary number of OFF periods are provided. Due to the foregoing, it is possible to obtain a stable surface property, and it becomes possible to provide a continuous casting apparatus, the cost of the electric equipment of which is low.

When the pinching force is moved downward, not only is the powder uniformly distributed, but also drawing of powder is facilitated, and further a downward movement of molten metal and a cast piece is facilitated. Therefore, the present invention is suitable for a continuous casting operation in which a casting rate is increased or powder is poured. On the other hand, in an embodiment in which the pinching force is moved upward, the pinching force, which is moving upward, not only makes the powder distribution uniform but also suppresses the injection of powder and the downward movement of molten metal and a cast piece. Accordingly, the embodiment in which the pinching force is moved upward is suitable when the casting rate is reduced or the injection of powder is suppressed.

What is claimed is:

1. A continuous casting apparatus for continuously casting molten metal comprising:

an electromagnetic coil arranged around molten metal in a mold in such a manner that the electromagnetic coil surrounds the mold;

an electric power supply unit for periodically generating to the electromagnetic coil a single phase alternating current which alternatively has a high root-mean-square value and a low root-mean-square value;

sensor means for detecting a surface of the molten metal in the mold;

means for transmitting information to the sensor means when the periodically generated single phase alternating current has a high root-mean-square value and for transmitting information to the sensor means when the periodically generated single phase alternating current has a low root-mean-square value.

2. A continuous casting apparatus for continuously casting molten metal according to claim 1, wherein a value for a level of the surface of the molten metal in the mold generated by the sensor means is determined in response to information from the means for transmitting information.

3. A continuous casting apparatus for continuously casting molten metal according to claim 1, wherein a value for a level of the surface of the molten metal in the mold generated by the sensor means is outputted in response to information from the means for transmitting information only when the single phase alternating current has a low root-mean-square value.

4. A continuous casting apparatus for continuously casting molten metal according to claim 1, wherein the means for transmitting information includes an electric signal wire.

5. A continuous casting apparatus for continuously casting molten metal according to claim 1, the sensor means including:

a primary signal generating device;

a primary sensor coil for generating an electromagnetic field from a current of the primary signal;

a secondary sensor coil for generating a secondary voltage when the secondary sensor coil crosses the electromagnetic field; and a secondary signal processing device for processing a signal of the secondary voltage generated by the secondary sensor coil.

6. A continuous casting apparatus for continuously casting molten metal according to claim 5, wherein output of the primary signal generating device is turned on and off in response to information from the means for transmitting information.

7. A continuous casting apparatus for continuously casting molten metal according to claim 5, wherein an output of the secondary signal processing device is turned on and off.

8. A continuous casting apparatus for continuously casting molten metal according to claim 1, wherein an output of the electric power supply unit is zero when an intensity of a single phase alternating current of the electromagnetic coil is low.

9. A continuous casting apparatus for continuously casting molten metal according to claim 1, wherein one period To is $30 \leq To \leq 300$ (msec) where To is the period from when the single phase alternating current has a high root-mean-square value to when the single phase alternating current has a low root-mean-square value and a frequency of the single phase alternating current f is $60 \leq f \leq 400$ (Hz).

* * * * *